March 10, 1936.　　　　D. L. LOTTS　　　　2,033,639

VARIABLE SPEED TRANSMISSION

Filed July 3, 1933　　　5 Sheets-Sheet 2

Witness:
Chas. R. Koursh

Inventor,
Delbert L. Lotts,
Parkinson & Lane, Attys.

March 10, 1936.  D. L. LOTTS  2,033,639
VARIABLE SPEED TRANSMISSION
Filed July 3, 1933    5 Sheets-Sheet 3

Witness:
Chas. L. Koursh

Inventor,
Delbert L. Lotts,
Parkinson & Lane Attys.

March 10, 1936.  D. L. LOTTS  2,033,639
VARIABLE SPEED TRANSMISSION
Filed July 3, 1933  5 Sheets-Sheet 4
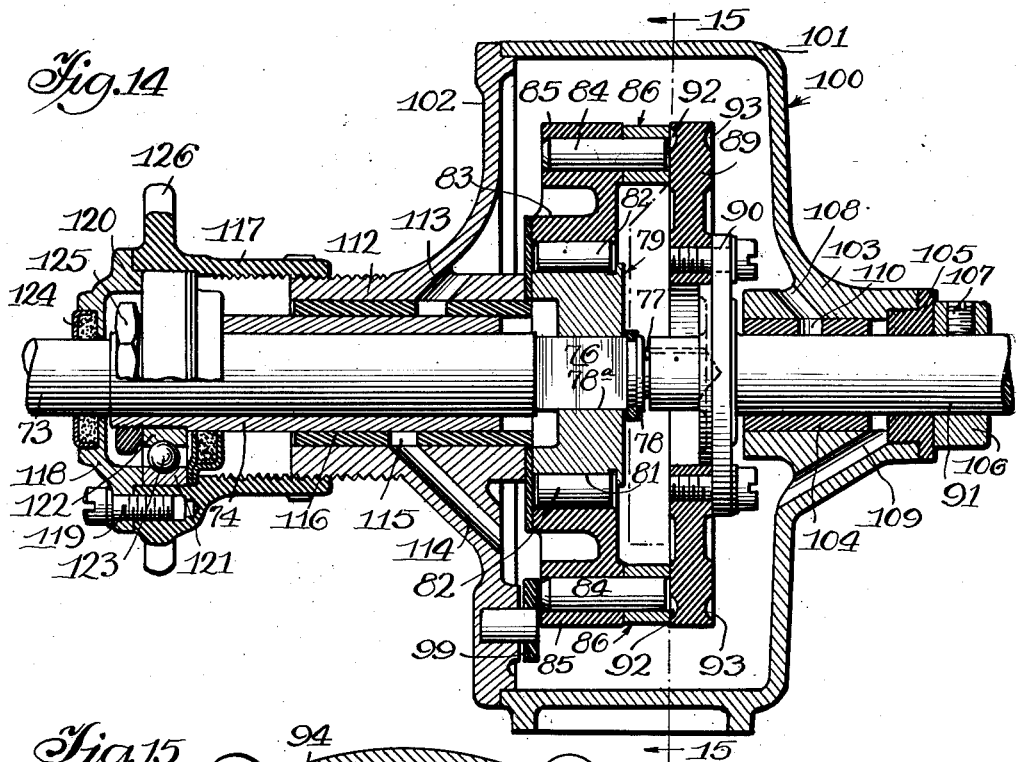
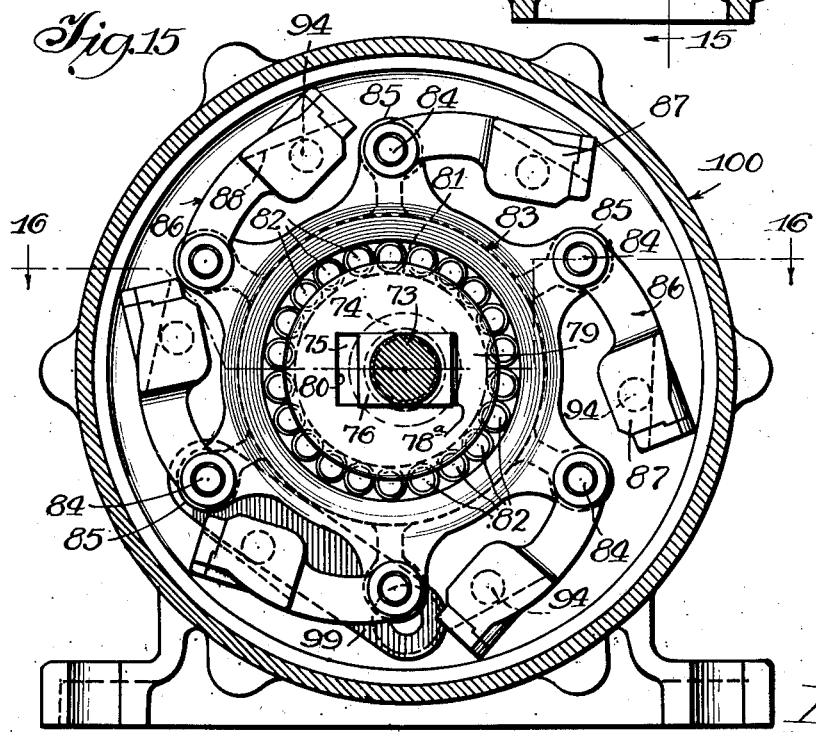
Inventor
Delbert L. Lotts, March 10, 1936.　　　D. L. LOTTS　　　2,033,639
VARIABLE SPEED TRANSMISSION
Filed July 3, 1933　　　5 Sheets-Sheet 5
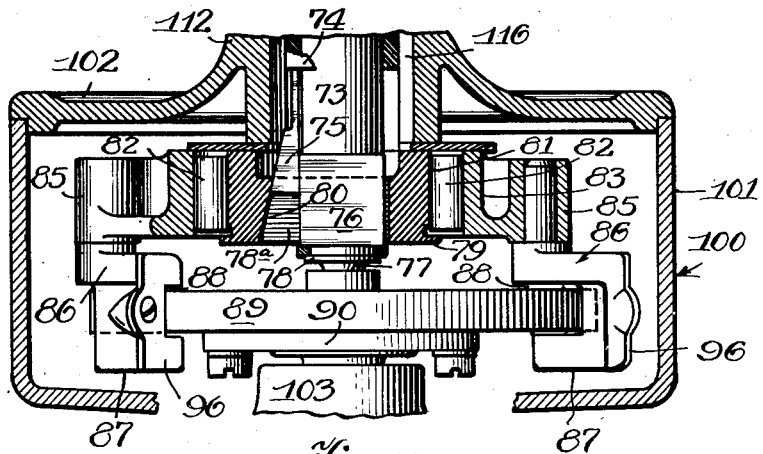
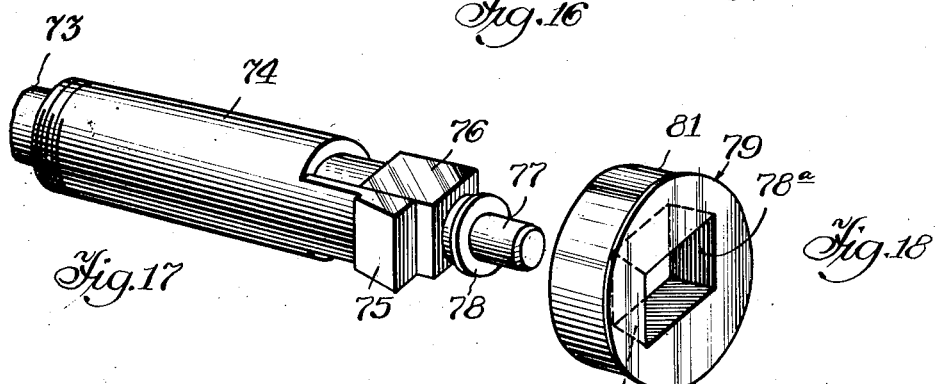
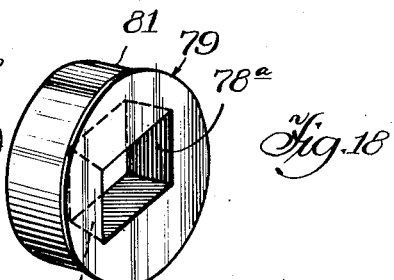
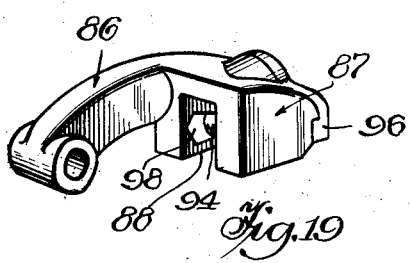
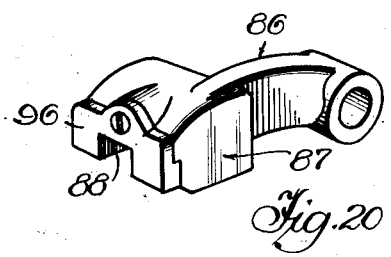
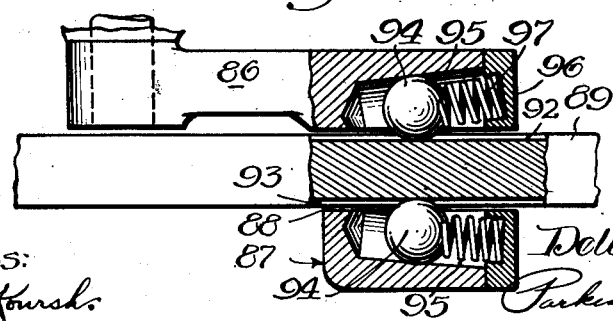
Inventor,
Delbert L. Lotts,
Witness:

Patented Mar. 10, 1936

2,033,639

UNITED STATES PATENT OFFICE 2,033,639

VARIABLE SPEED TRANSMISSION

Delbert L. Lotts, Chicago, Ill., assignor of three-fourths to Saul Bloch, Maurice I. Kaplan, and Jacob H. Jaffe, Chicago, Ill.

Application July 3, 1933, Serial No. 678,791

4 Claims. (Cl. 74—117)

The present invention relates to variable speed transmission and more particularly in the novel means and method of transmitting and converting the speed of the drive shaft whereby to drive a driven shaft at any desired speed, which speed may be instantly varied whenever desired.

Among the objects of the present invention is to provide a novel construction of variable speed transmission provided with means for securing any desired speed and for quickly and positively varying the speed of the driven member anywhere between its minimum and maximum limits.

A further object of the invention is the provision of a novel means and method of transmitting power whereby the speed may be varied between minimum and maximum, and in the novel means of transmitting the power whereby a direct drive is secured and the driving and driven members are interlocked to rotate as a unit.

Another object of the invention is in the novel construction and arrangement of variable speed drive in which the rotation of the driving member is transmitted to an eccentric mechanism which in turn transmits a positive rotation to the driven member. In the present embodiment, the speed of the driven member is varied by shifting the position of the eccentric and the ultimate speed of the driven member is normally limited by the degree of eccentricity to which the eccentric may be adjusted.

A still further object of the invention is the provision of a variable speed transmission mechanism in which the member upon which is pivoted the power, is held stationary while the speed of the driven member is being increased from a minimum, and is locked to the driving member whereby to secure a direct drive and thereby eliminate all moving or intermediate parts or mechanism.

Yet another object of the invention is in the provision of a novel clutch mechanism associated with the eccentric member whereby to rotate the driven shaft at a predetermined speed depending upon the degree of eccentricity to which the eccentric member has been adjusted.

A further object is to provide a novel nonrotating clutch mechanism for driving the driven shaft, said mechanism having clutching members adapted when moved in one direction to grip and rotate the driven shaft, and when moved in another direction to release the shaft.

The invention further resides in the combination, construction, arrangements of parts and details illustrated in the accompanying drawings, and while there is shown therein a preferred embodiment, it is to be understood that the same is susceptible of modification and change, and comprehends other details and constructions without departing from the spirit of the invention.

Further objects are to provide a construction of maximum simplicity, efficiency, economy and ease of assembly and operation, and such further objects, advantages and capabilities as will later more fully appear and as are inherently possessed thereby.

In the drawings:

Fig. 3 is a view in perspective of the driving disc.

Fig. 4 is a view in perspective of the eccentric ring.

Fig. 5 is a view in perspective of the adjustable wedge bar.

Fig. 6 is a view in perspective of the means for locking the parts together to permit the drive shaft to directly drive the driven shaft.

Fig. 10 is a view similar to Fig. 8 but disclosing an alternate construction of clutch arm.

Fig. 11 is a view in horizontal cross section taken in a plane represented by the line 11—11 of Fig. 10.

Fig. 14 is a view in vertical cross section through the construction disclosed in Figs. 12 and 13.

Fig. 15 is a view in vertical cross section taken in a plane represented by the line 15—15 of Fig. 14.

Fig. 16 is a view in horizontal cross section taken on the irregular line 16—16 of Fig. 15.

Fig. 17 is a view in perspective of the drive shaft and sleeve construction carrying the wedge face or member.

Fig. 18 is a view in perspective of the eccentric disc.

Fig. 19 is a view in perspective of one of the clutch arms.

Fig. 20 is a view in perspective of the clutch arm shown in Fig. 19 in reversed position.

Fig. 21 is a view in vertical cross section through the clutch arm and showing the engagement of the balls in the race ways of the driven disc.

Figure 1:
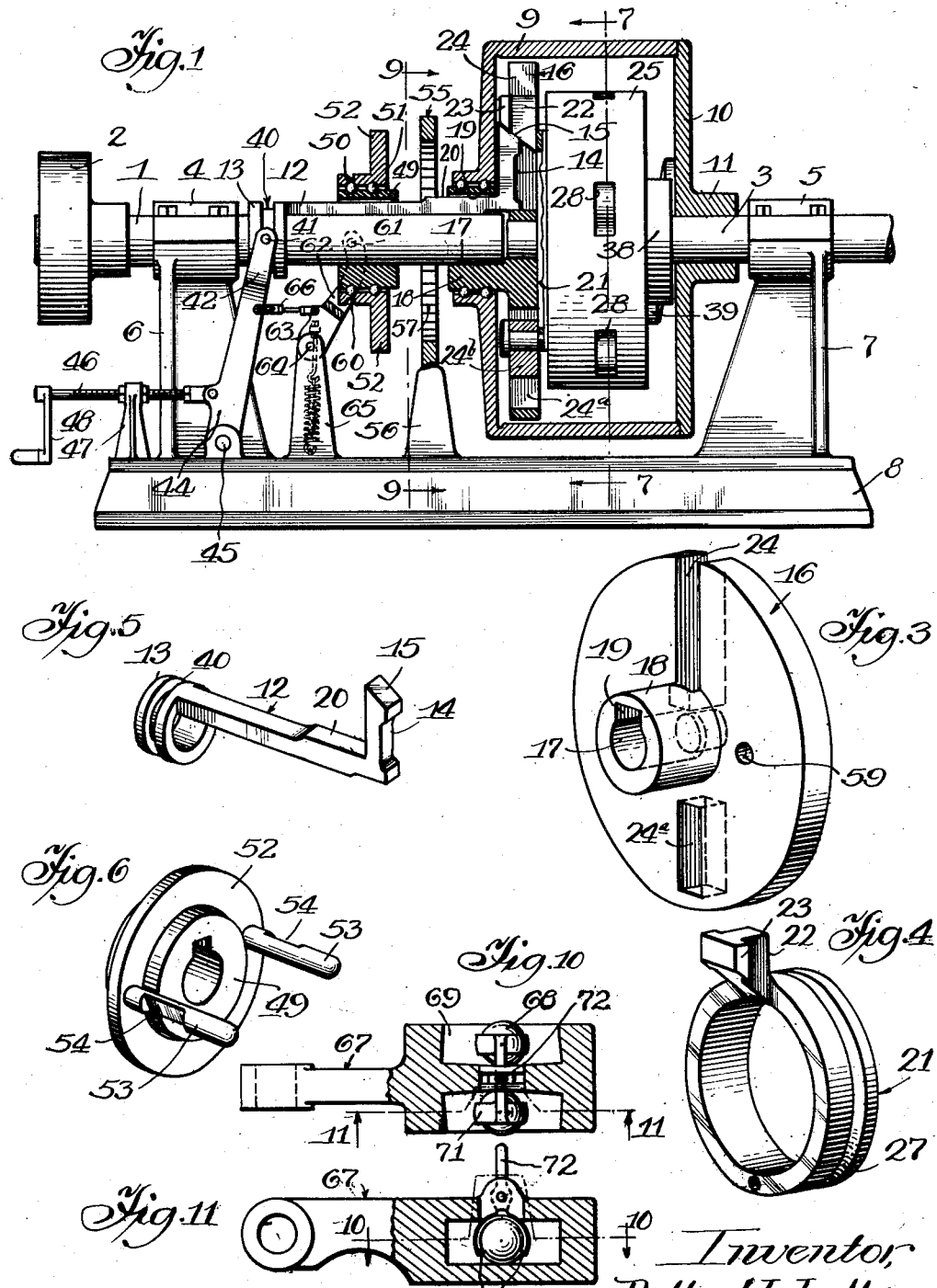
Fig. 1 is a view, part in side elevation and part in vertical cross section, of the novel transmission mechanism.

Referring more particularly to the disclosure in the drawings, the drive member is shown as comprising a shaft 1 upon which is mounted a drive pulley 2. This drive shaft 1 and the driven shaft 3 are mounted in bearings 4 and 5 on pedestals or standards 6 and 7 respectively, the latter formed or seating on a base 8.

Mounted upon and receiving the inner ends of the drive and driven shafts is a sectional housing comprising a cup-shaped member 9 having an end bell or closure 10, the latter being provided with a hub 11 forming a bearing for the driven shaft 3. The drive shaft 1 is slotted to receive a longitudinally extending bar 12 provided at one end with a ring or sleeve 13 encompassing the shaft, and at its opposite end with an upstanding wedge member 14 having a wedge face 15. The member 14 extends or projects into a plate or disc 16 having an opening 17 through its hub 18 to receive the drive shaft, and a keyway 19 for receiving the enlarged portion 20 of the bar 12.

An eccentric ring 21 is provided with a wedge-shaped projection 22 having oppositely extending flanges or shoulders 23. This projection is slidable in a radial slot 24 with the flanges or shoulders 23 seating against the edges of the slot and guided thereby. These flanges or shoulders not only prevent longitudinal displacement of the disc and eccentric ring, but also permit free sliding movement of the eccentric ring. By shifting the bar longitudinally of the shaft, the wedge face on the bar by reason of its contacting the complementary wedge face on the eccentric ring, will shift the eccentric ring from a position concentric with the drive shaft, to any one of the vast number and range in which it is eccentric thereto. A radial slot 24ª is also provided in the disc or plate 16 for receiving a block or member 24ᵇ adapted to slide therein as the eccentricity of the ring is shifted, but clamping said eccentric ring and disc together whereby they rotate as a unit.

Figure 8:
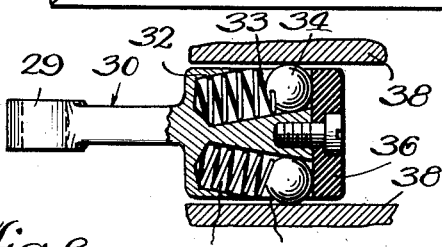
Fig. 8 is a horizontal cross sectional view through one of the clutch arms.
Figure 7:
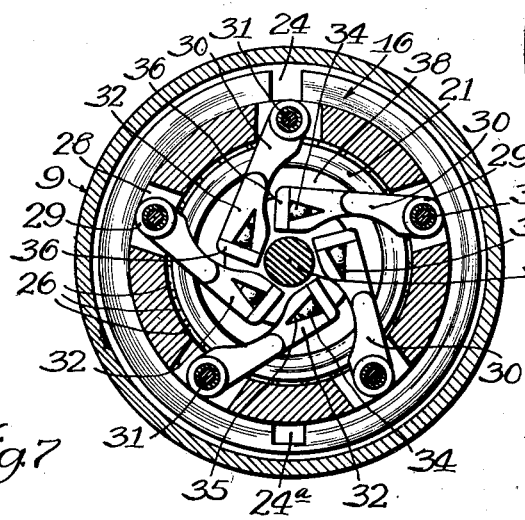
Fig. 7 is a view in vertical cross section taken in a plane represented by the line 7—7 of Fig. 1.
Figure 9:
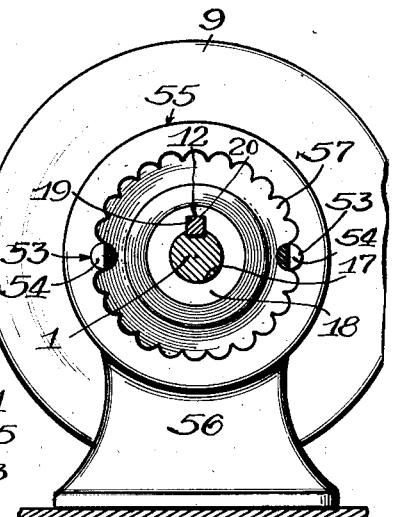
Fig. 9 is a view in vertical cross section taken in a plane represented by the line 9—9 of Fig. 1.
Figure 12:
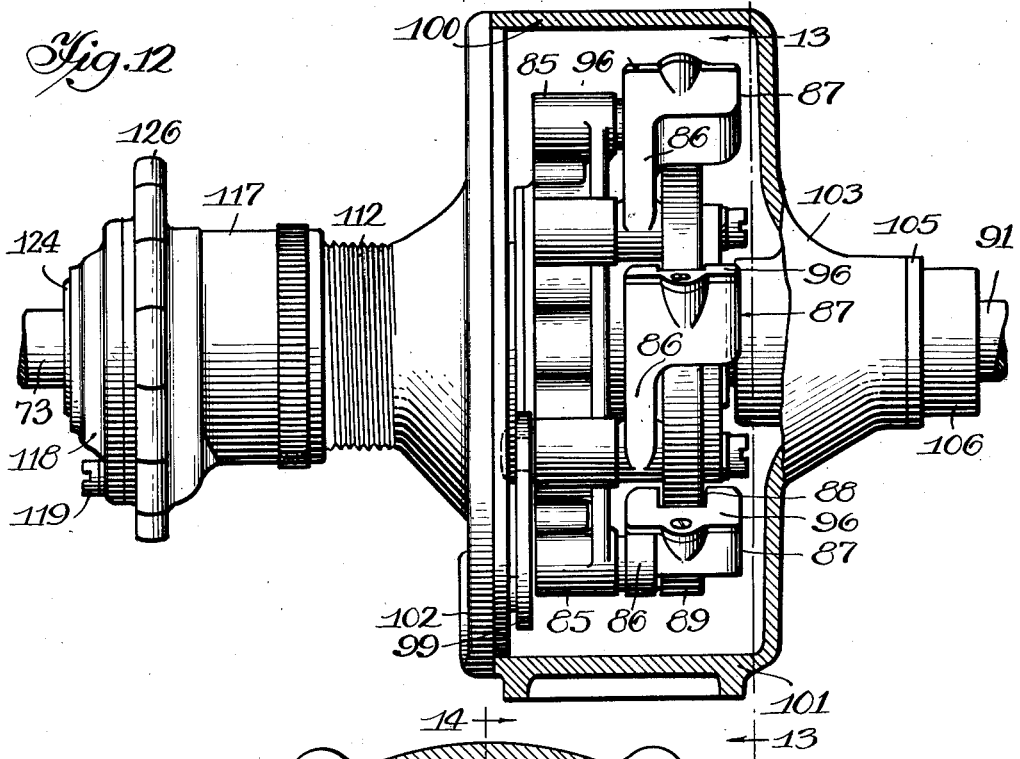
Fig. 12 is a view in side elevation with parts broken away, of an alternate construction of transmission.
Figure 13:
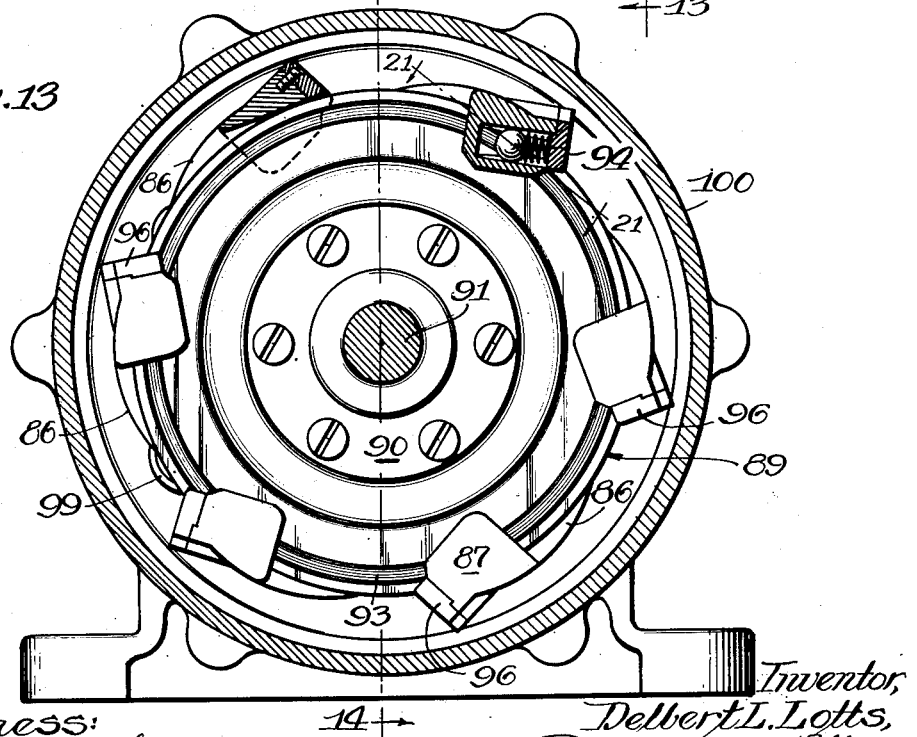
Fig. 13 is a view in vertical cross section taken in a plane represented by the line 13—13 of Fig. 12.

A band 25 encompasses the eccentric ring 21 and is provided with a raceway for receiving bearings or balls 26 which also seat in a raceway 27 provided in the ring 21. The band 25 is provided with arcuate cut-out portions 28 in its circumference for receiving the outer end 29 of a series of clutch arms 30. These arms are pivotally mounted on a pin or bolt 31 whereby they are permitted free swinging movement. As clearly shown in Fig. 8, each clutch arm 30 is provided with an enlarged end 32 formed with oppositely inclined or angularly arranged slots 33 each adapted to receive a ball 34, which balls when in projected or extended position, project through openings 35 at the ends of the slots. A removable end plate 36 closes the end of the slots and limits the movement of the balls, while a spring 37 seats against each ball to normally maintain it in its extended or projected position. The clutch arms extend between discs or plates 38 mounted on the driven shaft 3 and which discs or plates are adapted to drive this shaft.

The band 25 is maintained against rotation by reason of a locking arm or strap 39 connected to the band and the end plate 10 of the outer casing or housing, which latter member is held stationary except when it is desired to directly drive the driven shaft from the drive shaft without a reduction in speed.

In order to shift the bar 12 and vary or adjust the eccentricity of the eccentric ring 21, the end or ring 13 is provided with an annular groove 40 adapted to receive lugs 41 projecting from the bifurcations or arms 42 and 43 of a lever 44 pivoted at 45 upon the base 8. This lever is connected to a rod 46 threaded in a bracket 47. The rod and lever are adjusted by means of a handle 48, and the lugs 41 on the arms of the lever move the bar 12 in either direction, depending upon the desired degree of eccentricity and speed of the driven shaft.

When it is desired to bring the speed of the driven shaft up to that of the drive shaft, the invention comprehends means to lock the casing or housing of the mechanism to the driving plate or disc 16. In the disclosed embodiment, there is provided a bushing 49 for the drive shaft having a slot for receiving the bar 12 whereby the bushing is locked to and rotates with the drive shaft. This bushing is provided with race ways as is a collar 50 encompassing the bushing, and bearings 51 are positioned in these race ways. The collar is provided with an annular flange 52 having spaced pins 53 thereon. These pins are outwardly notched at 54 in order to permit them to rotate within a plate 55 mounted on a standard 56.

This plate is in the form of a ring having on its inner periphery or circumference, a series of semi-circular cut-out portions 57. The cup-shaped housing 9 as well as the disc or plate 16 are provided with oppositely spaced openings 58 and 59, respectively, to receive the pins 53 when these pins are moved inwardly to lock the driving disc and housing or casing together whereby to provide a direct drive. This position is clearly shown in Figs. 1 and 2, at which time the notches 54 are opposite the cut-out portions 57 and the collar 50, disc or plate 16 and housing are free to revolve as a unit and directly drive the driven shaft. When the pins have been retracted from the plate or disc 16, the notches 54 and cut-out portions 57 are not in alignment and the cylindrical portion of the pins seats in the cut-out portions 57 and locks the casing or housing against rotation.

In order to shift the collar 50 and its pins into and out of engagement with the disc or plate 16, the collar is provided with an annular groove 60 to receive lugs 61 on arms or bifurcations 62 on a lever arm 63 pivoted at 64 on a bracket or lug 65. In the disclosed embodiment, an adjustable arm or turn buckle 66 connects the levers 44 and 63, and these members are so arranged that the pins 53 do not seat in the openings in the disc or plate 16 until substantially the limit of forward movement of the bar 12 has been reached.

In Figs. 10 and 11 there is disclosed a modified form of clutch arm 67 in which the balls 68 are seated in oppositely diverging or extending slots 69. The object of this type of construction is to permit a reversal of the direction of rotation of the driven shaft. This is accomplished by the provision of leaf springs 71 seating against the opposite sides of the balls and adapted to shift the position of the balls in either direction whereby to grip or clutch the sides of the discs or plates 38 and rotate them in either direction by contacting and clutching engagement therewith. This shifting is accomplished by pivoted lever arms 72 which may be shifted collectively by any suitable means such as a ring or the like encircling the actuating levers. In the construction disclosed in Figs. 1, 2, 7 and 8, the driven shaft will always be driven in one direction regardless of the direction of travel of the drive shaft.

In Figs. 12 to 21 inclusive, there is disclosed an alternate construction of variable speed transmission in which the drive shaft 73 is provided with a sleeve 74 slidable thereon and carrying a wedge face 75. Adjacent this wedge face, the shaft is enlarged to provide a square or polygonal head 76 and the end 77 of the shaft is reduced and provided with a collar 78. The head 76 and wedge face 75 seat within an opening 78ª in an eccentric disc 79 having a complementary wedge surface 80. The circumference of this disc is formed to provide a raceway 81 for receiving roller bearings 82 between the same and the inner periphery of a spider 83.

Pivotally mounted on the pins 84 on the projections 85 of the spider, are provided clutch arms 86. These arms have their ends 87 bifurcated to provide a groove 88 for receiving an annular disc 89 mounted upon a plate 90 which in turn is mounted upon and drives the driven shaft 91. Inner and outer raceways 92 and 93 are formed on the disc for receiving balls 94 in the oppositely inclined slots 95. The ends of these slots are closed by a removable end plate 96 provided with depressions in which are seated springs 97 normally forcing the balls outwardly whereby they partially project through openings 98 and into the raceways 92 and 93 and thereat alternately grip and release said disc as the spider is given a wobbling motion due to the eccentricity of the disc as it is being rotated by the drive shaft. In order to prevent the spider 83 from rotating, there is provided a locking strap or arm 99 connected to the casing or housing 100 and to one of the clutch arms 86.

The variable speed mechanism is enclosed within the casing or housing 100 which is formed of a cup-shaped section 101 and an end plate 102. The section 101 is provided or formed with a hub 103 in which is mounted a bearing 104 for the driven shaft 91. A threaded cap 105 closes an end of the hub and is retained in adjusted position by means of a collar 106 having a set screw 107 adapted to seat against the driven shaft. This hub is provided with oil or lubricant holes 108 and 109 communicating with an opening 110 in the bearing or bushing 104. The end plate 102 is also provided with a hub 112 threaded on its exterior and provided with oil or lubricant holes 113 and 114 communicating with an opening or openings 115 provided in the bearing or bushing 116.

In order to shift the sleeve 74 and its wedge face 75 whereby to adjust the position and eccentricity of the disc 79, there is provided a threaded sleeve 117 adapted to be threaded upon the hub 112 and having an end plate 118 connected thereto by bolts or the like 119. This end plate is provided with an annular shoulder 120 adapted to seat against a ring 121. A bushing 122 is threaded upon the end of the sleeve 74 and intermediate the bushing and this ring are provided bearings or balls 123. A plate 124 seals the end or interior of the ring, bushing and bearings, while a nut 125 retains the bushing in position. The threaded sleeve 117 is provided with a hand wheel 126 whereby upon a rotation of the hand wheel, the threaded sleeve 117 is screwed upon the threaded hub 112 and will force the sleeve 74 inwardly and thereby change the eccentricity of the disc 79 to vary the speed of the driven shaft.

From the above description and the disclosure in the drawings, it will be readily apparent that the invention comprehends a novel means and method of variable speed transmission. The invention eliminates all meshing of gears and the like, provides a minimum number of rotating and operating parts, is simple in operation and permits a change or reduction in speed of the driven shaft to any amount desired or required.

Figure 2:
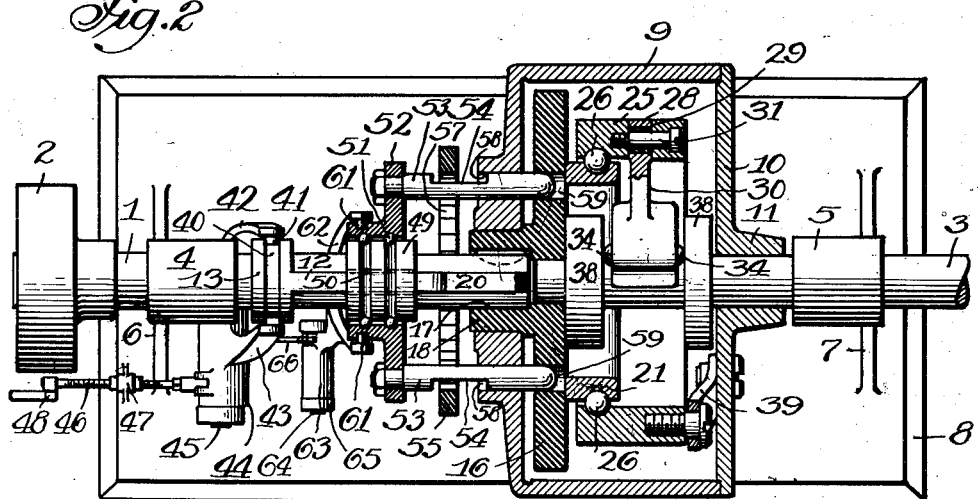
Fig. 2 is a view in vertical cross section of the transmission with the parts engaged to provide a direct drive.

As clearly disclosed in Figs. 1 and 2, the invention comprehends not only a reduction in speed throughout the complete range from minimum to maximum, but also a direct drive from the drive shaft to the driven shaft. When a one to one or direct drive is desired, the member over which the power is pivoted, which in the disclosed embodiment is the outer casing or housing, is held stationary while the speed of the driven shaft is increased from a minimum to a maximum, and is locked with the driving member to thereby eliminate all relatively movable parts when a direct drive is desired.

By means of the present construction, the driven shaft is given a greatly amplified torque throughout its range of speed reduction.

It will be further evident that although in the disclosed embodiments, the eccentric is rotated, it is possible to reverse the parts and maintain this member stationary.

Having thus disclosed the invention, I claim:

1. In a variable speed transmission having a driving and a driven shaft and means for transmitting a variable speed to said driven shaft, an eccentric carried on and rotated by said drive shaft, a non-rotatable floating member associated with said eccentric and given a wobbling motion thereby, means for anchoring said member against rotation, the extent of said motion depending upon the degree of eccentricity, and means for varying the degree of eccentricity of said eccentric between its minimum and maximum limits, said means comprising a wedge member slidable on the drive shaft and provided with a wedge surface, a complementary wedge surface on the eccentric, means for shifting the slidable member on the drive shaft whereby to shift the position of the eccentric and vary its degree of eccentricity, and means for directly driving said driven shaft when the limit of said eccentricity has been reached.

2. In a variable speed transmission, a drive and a driven shaft, an eccentric carried on and rotated by said drive shaft, a non-rotatable floating member associated with said eccentric and given a wobbling motion thereby, means for anchoring said member against rotation, clutch elements on said member adapted to intermittently engage the driven shaft and rotate the same, a casing providing a bearing for said driving and driven shafts and a housing for said eccentric member and clutch elements, means for varying the degree of eccentricity of said eccentric between its minimum and maximum limits and thereby vary the speed of said driven shaft, and means controlled by said first mentioned means to lock the casing to the drive shaft and directly drive the driven shaft.

3. In a variable speed transmission, a driving shaft, a driven shaft, having a clutching surface, an eccentric carried by the driving shaft a non-rotatable floating member cooperating with the eccentric, and clutch elements pivotally mounted on said member for alternately clutching and releasing said driven shaft whereby to drive said shaft in one direction, said elements being provided with an inclined slot and an opening in a side wall thereof, a ball in said slot and a spring seating against said ball and tending to force said ball through said opening and into clutching engagement with the clutching surface on the driven shaft.

4. In a variable speed transmission, a driving and a driven shaft, a disc on said driven shaft, an eccentric rotatable with the drive shaft, a non-rotatable floating member associated with said eccentric and given a wobbling motion thereby, means for anchoring said member against rotation, and clutch elements pivoted on said member and adapted to engage said disc, each element being provided with oppositely inclined slots having an opening, a ball in each of said slots and adapted to project through said opening whereby to clutch said disc, and a spring seating against said ball tending to force said ball into clutching engagement with the disc whereby to rotate the driven shaft.

DELBERT L. LOTTS.